US005432504A

United States Patent [19]

Shaw et al.

[11] Patent Number: 5,432,504

[45] Date of Patent: Jul. 11, 1995

[54] VISUAL DISPLAY TERMINAL DEVICE & METHOD FOR EYE STRAIN REDUCTION

[76] Inventors: John B. Shaw, 719 Antelope, Crosby, Tex. 77532; Sharon Shaw; Betty Ross, both of 15012 Valerio St., Van Nuys, Calif. 91405

[21] Appl. No.: 34,535

[22] Filed: Mar. 19, 1993

[51] Int. Cl.[6] .......... G08B 5/00

[52] U.S. Cl. .......... 340/815.73; 359/601; 362/234

[58] Field of Search .......... 340/815.01, 815.15, 340/815.16, 815.17, 815.2, 815.4, 815.49, 815.73, 815.75; 362/253, 227, 249, 234, 235, 243, 247, 30; 358/250, 252; 359/601, 609, 613, 615; 348/834, 832, 842

[56] References Cited

U.S. PATENT DOCUMENTS

| | | | |
|---|---|---|---|
| 1,461,131 | 7/1923 | Marten . | |
| 2,162,791 | 10/1937 | Shreve | 359/609 |
| 3,843,961 | 10/1974 | Mirell | 358/252 |
| 4,001,810 | 1/1977 | Olsen . | |
| 4,577,928 | 3/1986 | Brown | 358/252 |
| 5,159,328 | 10/1992 | Albrecht . | |
| 5,219,445 | 6/1993 | Bartenbach | 36/253 |

OTHER PUBLICATIONS

IBM "Technical Disclosure Bulletin" 1977, p. 328.

*Primary Examiner*—Alvin E. Oberley
*Assistant Examiner*—Regina Liang
*Attorney, Agent, or Firm*—John J. Connors; Connors & Associates

[57] ABSTRACT

Disclosed is a device 10 for a video screen 16 which includes a support member 12 member disposed about the circumference of the video screen 16. The support member 12 has walls with interior reflective surfaces 30. A plurality of point light sources or lamps 32 are mounted to the support member 12 and positioned to provide to inner and outer concentric frames 50 and 52 of light on the screen 16. The inner frame 52 comprises a series of discrete point light images or dots 46 near the circumference of the screen 16 formed by light from the light sources being cast directly onto the screen. The outer frame 50 comprises a series of discrete point light images or dots near the circumference of the screen 16 formed by light from the light sources 32 first reflecting off the reflective surfaces 30 and then onto the screen 16. The intensity of the light from the inner frame 52 is less than the intensity of light from the outer frame 50.

11 Claims, 4 Drawing Sheets

FIG. 6
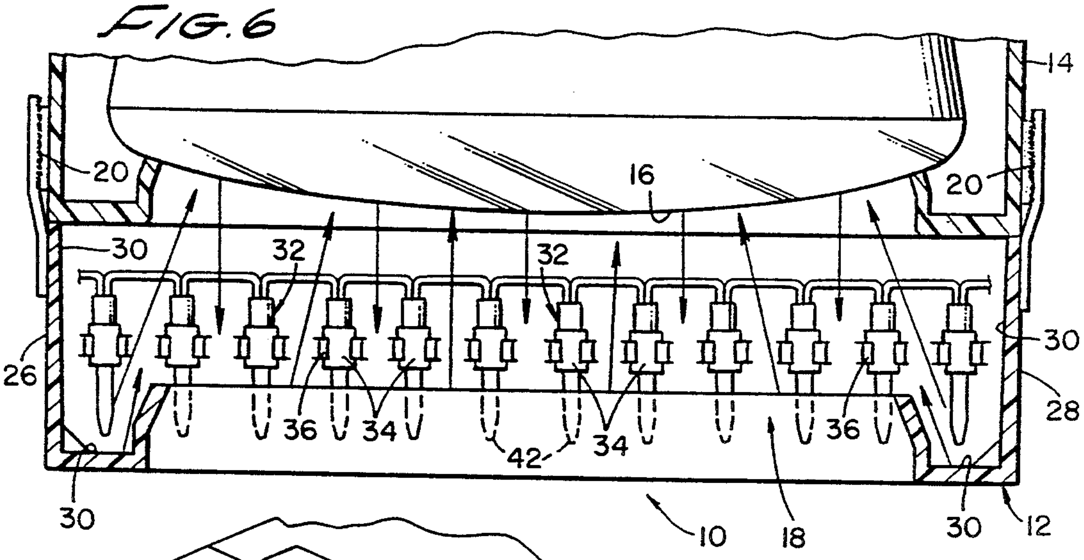
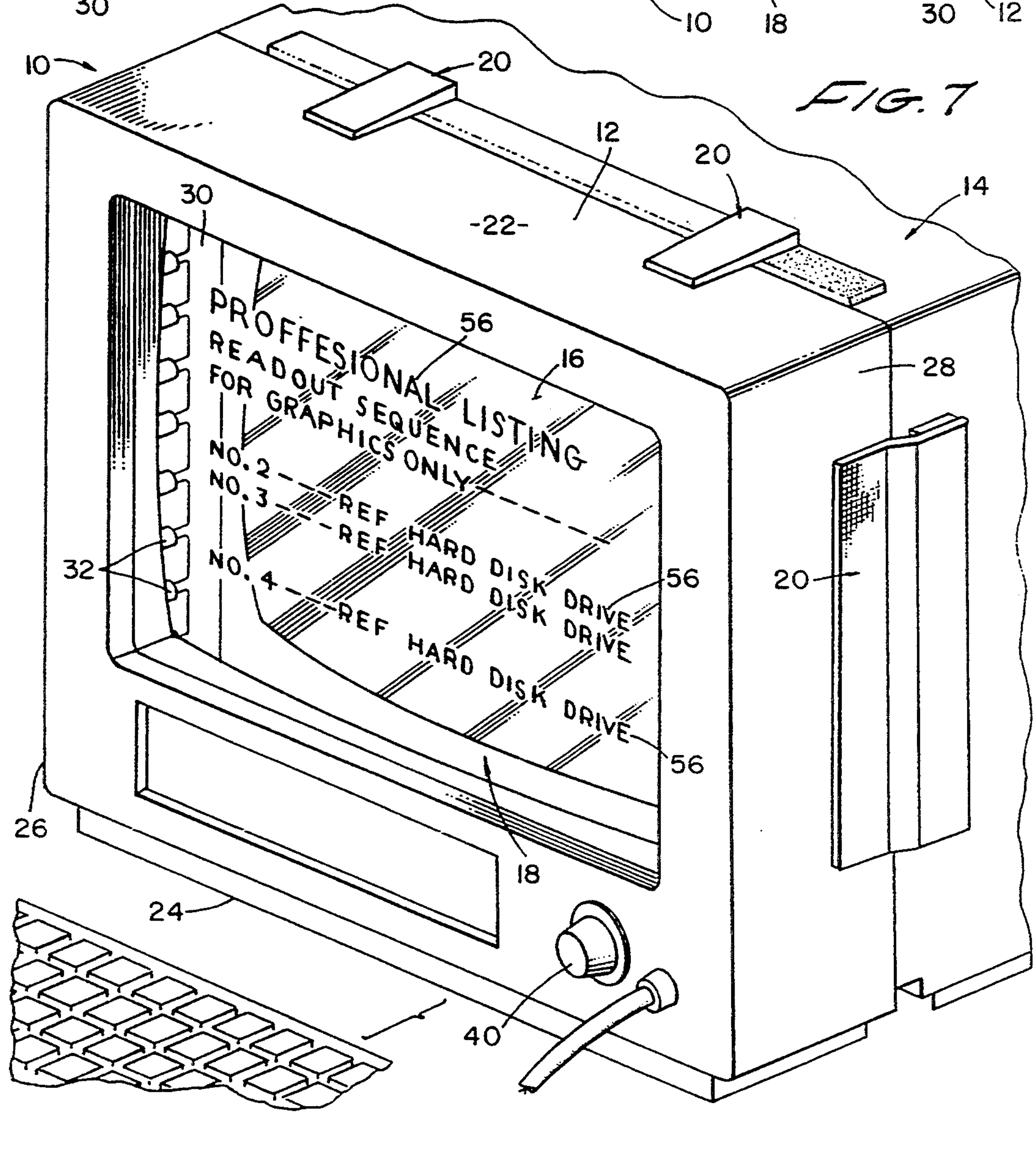
FIG. 7

VISUAL DISPLAY TERMINAL DEVICE & METHOD FOR EYE STRAIN REDUCTION

BACKGROUND OF THE INVENTION

1. Field of the Invention

This invention relates to a device which creates a three-dimensional effect which reduces eye strain caused by prolonged viewing of a video screen.

2. Background Discussion

With the increase use of computers, workers are frequently required to sit for long periods in front of a video screen. Glare from the screen leads to rapid fatigue and creates eye strain, resulting in headaches, or even more serious health hazards produced by stress. A simple and inexpensive device that is easy to install, or that could be built into the housing for the video screen as original equipment when the screen is manufactured, would provide an ideal solution to the problem of eye strain.

SUMMARY OF THE INVENTION

It is the objective of this invention to provide a device and method which reduces eye strain caused by prolonged viewing of a video screen. In accordance with this invention, the electronic images formed on the video screen appear as if they were three dimensional. What the eye perceives, the brain believes. Consequently, this optical illusion reduces eye strain.

The device of this invention has several features, no single one of which is solely responsible for its desirable attributes. Without limiting the scope of this invention as expressed by the claims which follow, its more prominent features will now be discussed briefly. After considering this discussion, and particularly after reading the section entitled, "DETAILED DESCRIPTION OF THE PREFERRED EMBODIMENT," one will understand how the features of this invention provide its advantages, which include ease of installation and use, and in particular, reduction eye strain.

The first feature of the device of this invention is a support member disposed about the circumference of the video screen. This support member may be retrofitted on existing video screens or be included as a component of the original equipment.

The second feature is that the support member has an interior wall including a reflective surface. The reflective surface need not be mirror-like. It only need be sufficiently smooth so that light from a point light source near the reflective surface forms an image of the source on this surface. The reflective surface reflects this image of the point light source onto the surface of the video screen.

The third feature is that a plurality of point light sources are mounted to the support member. These point light sources may be, for example, small, low energy consuming, low voltage lamps connected together in series. The lamps emit light of substantially equal intensity. Preferably, the lamps emit red light and the screen has a dark or black background. Each lamp has a tiny bulb enclosing a filament, and the bulbs are pointed away from the screen and towards the interior wall. The light from the filaments is focused as dots of light on the reflective surface and also focused as dots of light directly on the screen as it passes through the bulb.

The fourth feature is that the lamps are positioned within the support member to provide near the edge of the screen two separate, concentric frames of light made up of a series of discrete dots or points. The diameter of these dots of light is less than about 1/16 inch. The shape of these frames of light are typically rectangular, but other geometric configurations are suitable, although they preferably will correspond to the configuration of the screen. The innermost frame of light is formed by light from the light sources first reflecting off the reflective surface of interior wall of the support member and onto the screen. The outermost frame of light is formed by light from the light sources being cast directly onto the screen. The innermost frame of light has dimensions less than the outer most frame of light. The light dots comprising the outermost frame have a greater intensity than the light images comprising the innermost frame. The two frames of light are spaced apart a distance which is less than about two inches, and they both are within about 3 inches, preferably about 2.5 inches, from the frame of the screen. The intensity of the light points comprising the innermost frame are essentially equal to each other, and the intensity of the light points comprising the outer most frame are essentially equal to each other. These frames of light create for a viewer looking at the screen a perspective quality or three dimensional effect.

This invention also includes a method of creating a three dimensional effect on a video screen, comprising the following steps:

(i) forming a first frame of light on the screen near the circumference of the screen which has a predetermined intensity, and (ii) forming a second frame of light on the screen near the circumference of the screen which is disposed within the first frame, is substantially concentric with the first frame, is equally spaced from the first frame a distance which is less than two inches from the first frame, and has an intensity which is less than the intensity of said first frame, (iii) positioning the first and second frames so that they are both within at least 3.0 inches from the circumference of the screen.

BRIEF DESCRIPTION OF THE DRAWING

The preferred embodiment of this invention, illustrating all its features, will now be discussed in detail. This embodiment depicts the novel and non-obvious method and device of this invention shown in the accompanying drawing, which is for illustrative purposes only. This drawing includes the following FIGURES (FIGS.), with like numerals indicating like parts:

FIG. 6 is a cross-sectional view taken along line 6—6 of FIG. 3

FIG. 7 is perspective view showing the three dimensional effect created by the device of this invention.

DESCRIPTION OF THE PREFERRED EMBODIMENT

Figure 1:
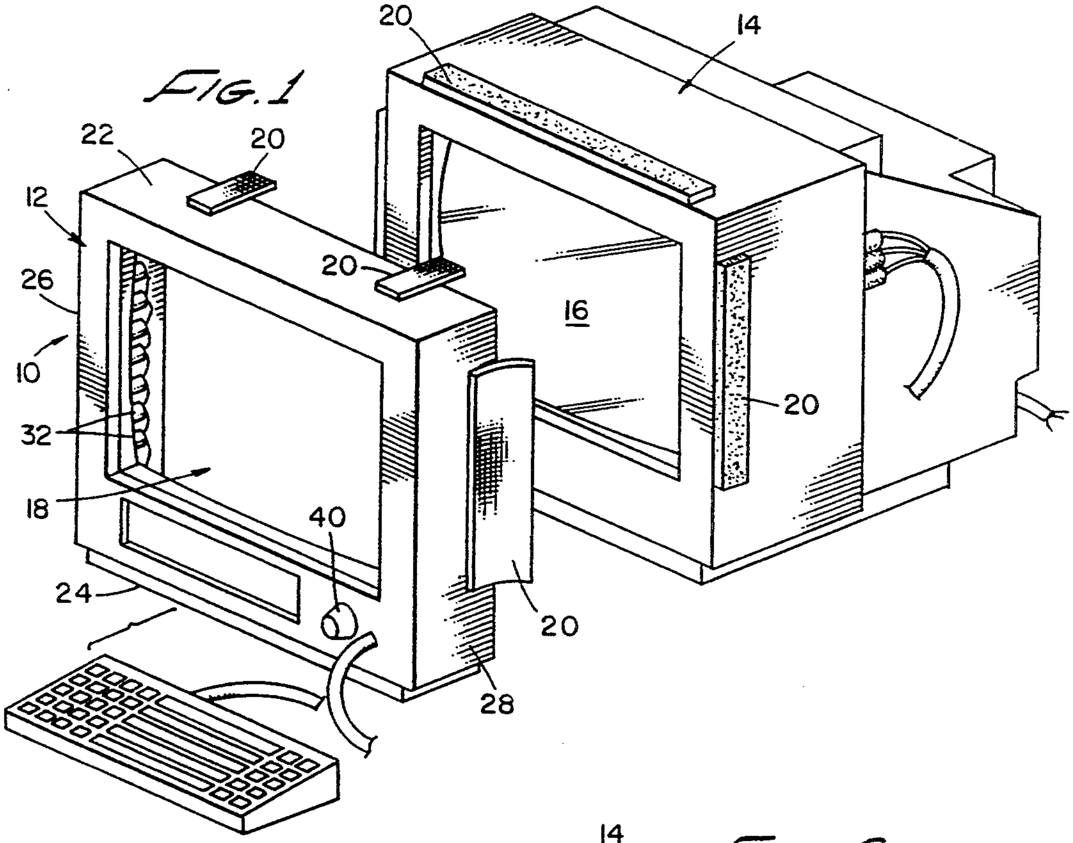
FIG. 1 is an exploded perspective of the device of this invention position to be mounted on the front end of a video display terminal.
Figure 2:
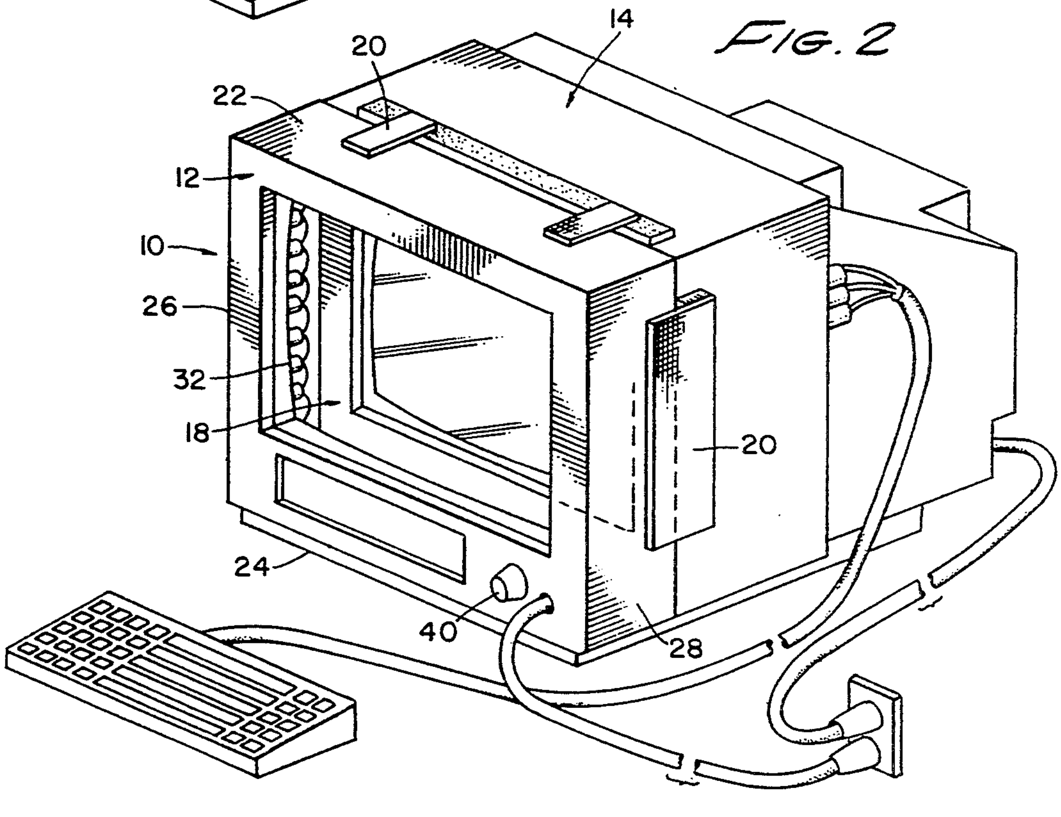
FIG. 2 is a perspective view showing the device of this invention mounted adjacent to and surrounding the video screen of the display terminal.

As illustrated in FIGS. 1 through 4, the device 10 of this invention comprises a rectangular support member 12 molded from polymeric material. The device 10 is adapted to be removably mounted to the front of a video display terminal 14 so that the support member 12 is immediately adjacent to and surrounding the rectangular circumference of the video screen 16 of the display terminal. The support member 12 has a rectangular opening 18 with dimensions about equal to the dimensions of the screen 16. Preferably, hook-and-fabric type fasteners 20 are used to removably mount the device 10 to the video display terminal 14.

The support member 12 includes a top wall 22, a bottom wall 24, and two side walls 26 and 28. The internal surfaces 30 of these walls 22, 24, 26, and 28 are smooth and reflective. A plurality of lamps 32 are mounted inside the support member 12 adjacent the surfaces 30. Each lamp 32 has a socket 34 which is received in a plastic mount 36 comprising two fingers *36a* and *36b* which firmly grip the socket 34, but allow the socket to be manually pulled from between the fingers. The lamps 32 are connected in series by a cable 38, with a variable resistor 40 in series connection with the lamps. The resistor 40 allows the viewer to increase or decrease the intensity of the light being emitted by the lamps 32.

Figure 8:
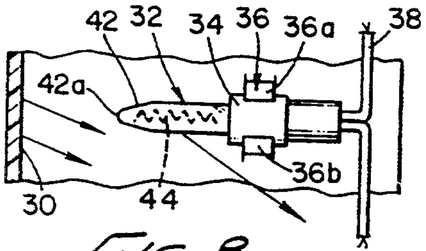
FIG. 8 is a fragmentary view showing one of the lamps positioned adjacent an interior wall of the support member of the device of this invention.
Figure 9:
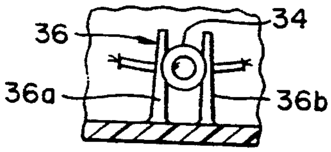
FIG. 9 is a fragmentary cross-sectional view showing the mount for the lamp shown in FIG. 8.
Figure 3:
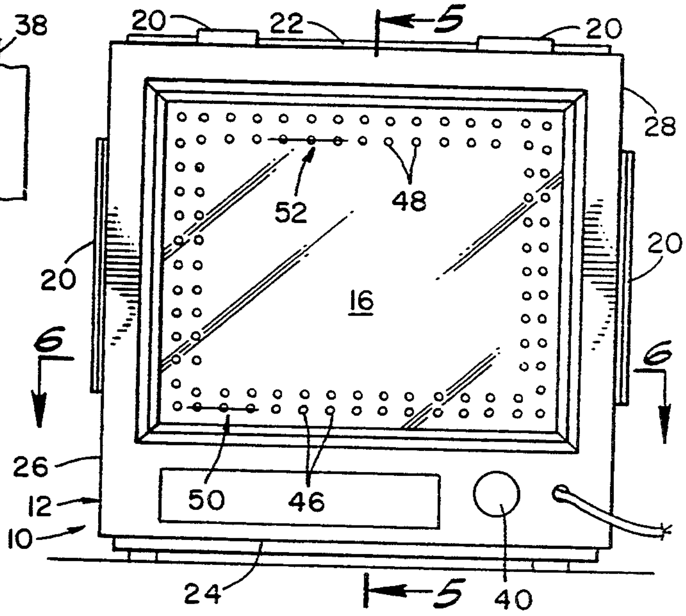
FIG. 3 is a front elevational view of the video screen showing the inner and outer frames of light images created on the video screen.
Figure 4:
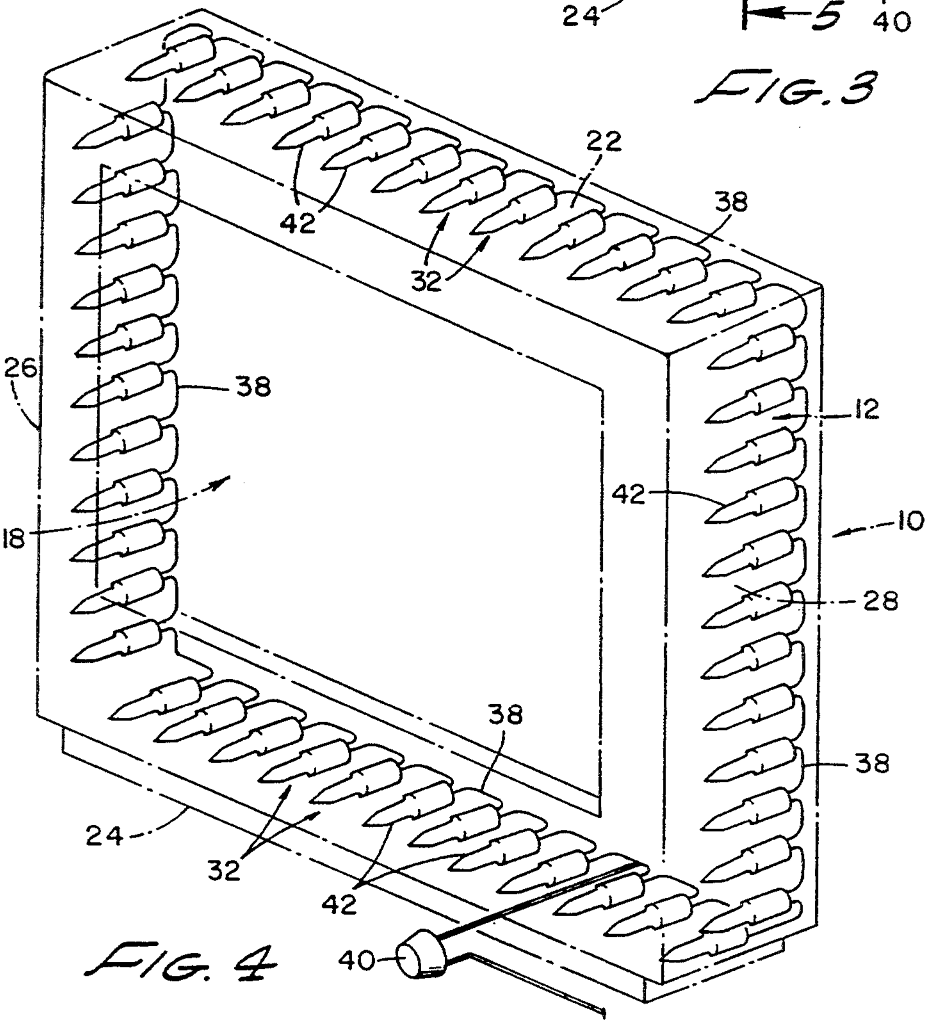
FIG. 4 is a perspective view showing the arrangement of lamps mounted within the support member of the device of this invention.
Figure 5:
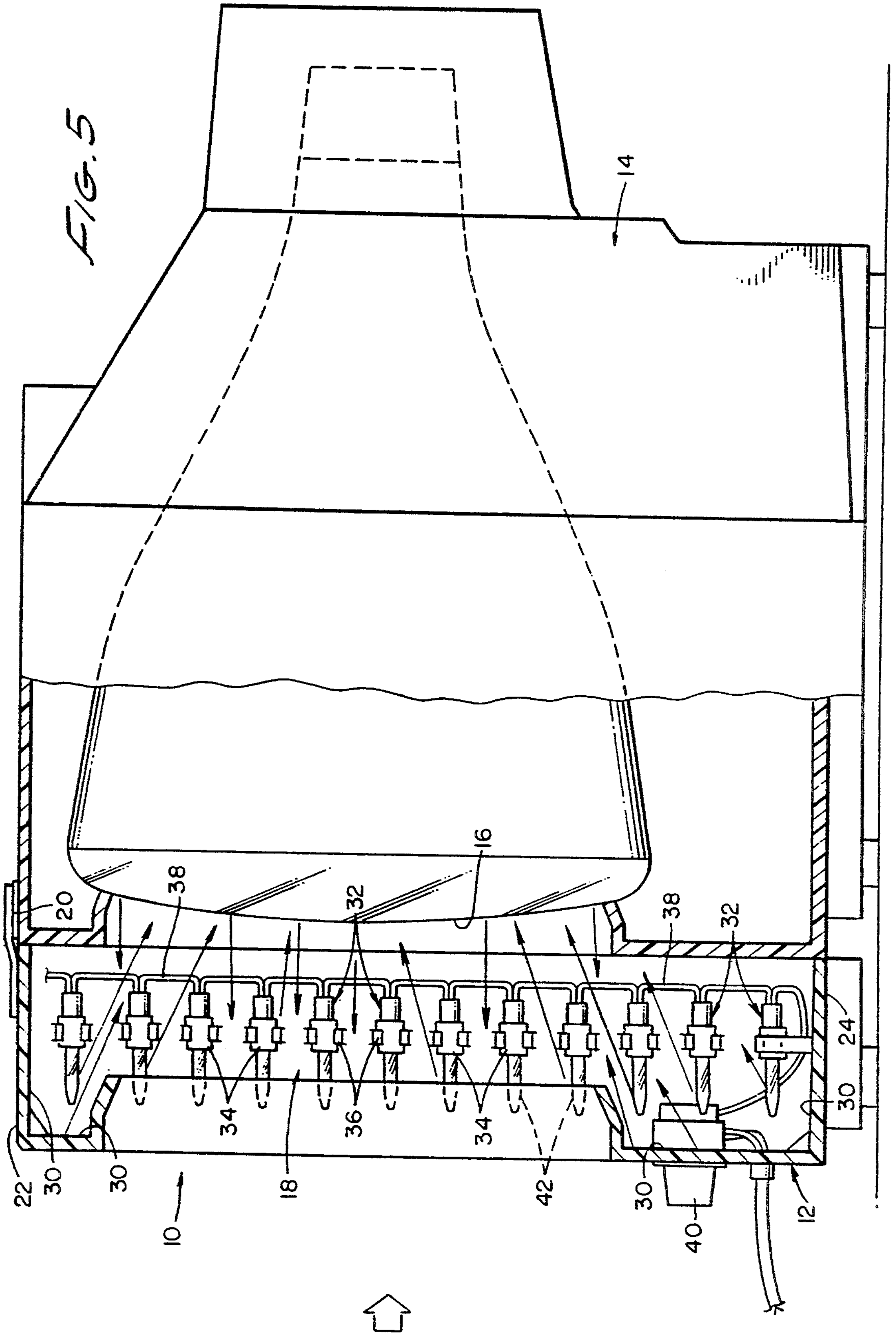
FIG. 5 is a cross-sectional view taken along line 5—5 of FIG. 3.

As depicted in FIG. 8, each lamp 32 has a bulb 42 enclosing a filament 44, with the bulb's pointed lens tip 42a pointing towards the interior surface of the wall 30. The lamps 32 are approximately equally spaced apart, and carefully positioned so that light from the filament is both focused on the internal surfaces 30 and directly on the surface of the screen 16. As illustrated in FIG. 3, the light directly focused on the screen 16 appears as a series of points or dots 46 to create an outer rectangular frame 50 adjacent the circumference of the video screen 16. The light from the filaments 44 is also focused by the bulb on the interior surfaces 30 as a series of dots (not shown) on the surfaces. This light reflects off the interior surface 30 and is cast onto the screen 16 to form an inner frame 52 of light comprising a series of dots 48. The light dots 48 in the inner frame 52 are of a lesser intensity than the light dots 46 of the outer frame 50. As illustrated in FIG. 7, this creates a three dimensional effect which produces an optical illusion that the viewer experiences when seated before the video screen 16. The optical illusion gives a perspective quality to the electronic images 56 on the screen 16. Consequently, the electronic images 56 appear to project outward from the surface of the screen 16. The two frames of light 50 and 52 create this perspective quality and the three dimensional optical illusion.

In the preferred embodiment of this invention, light emitted from each lamp 32 is red light, and each lamp 32 produces light of the same intensity as any other lamp 32. Preferably, the video screen 16 has a dark or black background. Decorative lights sold by Willis Electric Company Limited, identified as E5643-WT including 50 lamps in series, rated at 120 volts, have been found to work quite satisfactorily to produce the desired optical illusion.

Scope of the Invention

The above presents a description of the best mode contemplated of carrying out the present invention, and of the manner and process of making and using it, in such full, clear, concise, and exact terms as to enable any person skilled in the art to which it pertains to make and use this invention. This invention is, however, susceptible to modifications and alternate constructions from that discussed above which are fully equivalent. Consequently, it is not the intention to limit this invention to the particular embodiment disclosed. On the contrary, the intention is to cover all modifications and alternate constructions coming within the spirit and scope of the invention as generally expressed by the following claims, which particularly point out and distinctly claim the subject matter of the inventions.

We claim:

1. A device for a video screen, including a support member disposed about the circumference of the video screen, said support member having an interior wall, a plurality of point light sources mounted to the support member and positioned to provide (i) a first frame of discrete point light images on the screen near the circumference of the screen formed by light from the light sources first reflecting off said wall and onto the screen and then off the screen, and (ii) a second frame of discrete point light images on the screen near the circumference of the screen formed by light from the light sources being cast directly onto the screen and then reflecting off the screen, said first frame having dimensions less than the second frame and disposed within the second frame substantially concentric.

2. The device of claim 1 where the light sources are pointed away from the screen and towards said interior wall.

3. The device of claim 1 where the light images comprising the second frame have a greater intensity than the light images comprising the first frame.

4. The device of claim 1 where the light sources emit light of substantially equal intensity.

5. The device of claim 1 where the light sources emit red light and the screen has a dark or black background.

6. The device of claim 1 where the first and second frames are spaced apart a distance which is less than two inches.

7. The device of claim 1 where the first and second frames are within 2.5 inches from the circumference of the screen.

8. The device of claim 1 where the screen and the first and second frames each have a substantially rectangular configuration.

9. A device for a substantially rectangular video screen, including a rectangular support member disposed about the circumference of the video screen, said support member having an interior wall, a plurality of point light sources mounted to the support member, pointing away from the screen and towards said interior wall to position said light sources to provide (i) a first rectangular frame of discrete point light images of substantially the same intensity on the screen near the frame of the screen formed by light from the light sources first reflecting off said wall and onto the screen and then off the surface of the screen, and (ii) a second rectangular frame of discrete point light images of substantially the same intensity on the screen near the circumference of the screen formed by light from the light sources being cast directly onto the screen and then reflecting off the screen, said first frame having dimensions less than the second frame and disposed within the second frame substantially concentric, and the light images comprising the second frame having a greater intensity than the light images comprising the first frame, and said first and second frames being spaced apart a distance which is less than two inches, with said first and second frames being within at least 3.0 inches from the circumference of the screen.

10. The device of claim 9 where the light sources emit light of substantially equal intensity.

11. The device of claim 10 where the light sources emit red light and the screen has a dark or black background.

* * * * *